US007443810B2

(12) United States Patent
Boyle

(10) Patent No.: US 7,443,810 B2
(45) Date of Patent: Oct. 28, 2008

(54) WIRELESS TERMINALS

(75) Inventor: Kevin R. Boyle, Horsham (GB)

(73) Assignee: NXP B.V., Eindhoven (NL)

( * ) Notice: Subject to any disclaimer, the term of this patent is extended or adjusted under 35 U.S.C. 154(b) by 673 days.

(21) Appl. No.: 10/510,257

(22) PCT Filed: Apr. 1, 2003

(86) PCT No.: PCT/IB03/01396

§ 371 (c)(1), (2), (4) Date: Oct. 5, 2004

(87) PCT Pub. No.: WO03/008577

PCT Pub. Date: Oct. 16, 2003

(65) Prior Publication Data

US 2005/0213521 A1 Sep. 29, 2005

(30) Foreign Application Priority Data

Apr. 9, 2002 (GB) ................................ 0208130.5

(51) Int. Cl.

| | |
|---|---|
| ***H04J 1/00*** | (2006.01) |
| ***H04B 3/20*** | (2006.01) |
| ***H04L 5/14*** | (2006.01) |
| ***H01Q 5/00*** | (2006.01) |
| ***H01Q 1/24*** | (2006.01) |

(52) U.S. Cl. ....................... 370/281; 370/290; 370/295; 455/82; 343/702; 343/700 MS

(58) Field of Classification Search ......... 370/276–295; 455/82–84, 78; 343/907, 700 MS, 702
See application file for complete search history.

(56) References Cited

U.S. PATENT DOCUMENTS

| | | | | |
|---|---|---|---|---|
| 4,672,685 A | | 6/1987 | Phillips | |
| 5,365,246 A | * | 11/1994 | Rasinger et al. | 343/702 |
| 5,926,139 A | * | 7/1999 | Korisch | 343/702 |
| 6,252,554 B1 | * | 6/2001 | Isohatala et al. | 343/700 MS |
| 6,278,342 B1 | * | 8/2001 | Ella | 333/189 |
| 6,332,071 B1 | * | 12/2001 | Brandt | 455/82 |
| 6,624,788 B2 | * | 9/2003 | Boyle | 343/702 |
| 6,664,931 B1 | * | 12/2003 | Nguyen et al. | 343/767 |

FOREIGN PATENT DOCUMENTS

| | | |
|---|---|---|
| JP | 61-265905 | 11/1986 |
| WO | WO 02/071535 A1 | 9/2002 |

* cited by examiner

*Primary Examiner*—Chi H. Pham
*Assistant Examiner*—Tri H. Phan

(57) ABSTRACT

A wireless terminal for use in the transmitting and receiving frequency bands of a frequency duplex system comprises transmitting and receiving stages (Tx, Rx) and signal propagating means (22, 24, 26) coupled to the transmitting and receiving stages. The signal propagating means comprises a narrow band antenna structure (24), such as a Planar Inverted-F Antenna (PIFA), having sufficient bandwidth to cover the larger one of the transmitting and receiving frequency bands and a BAW receiving filter (26) and a BAW transmitting filter (22) coupled by respective feeds to the antenna structure (24). The filters (22, 26) enable the antenna structure to have a small volume and be reusable at different FDD frequencies.

6 Claims, 4 Drawing Sheets

WIRELESS TERMINALS

TECHNICAL FIELD

The present invention relates to improvements in or relating to wireless terminals, particularly, but not exclusively, to wireless terminals operating in accordance with protocols including frequency division duplex (FDD) systems, such as GSM, DCS and UMTS, having separate transmit and receive frequency bands.

BACKGROUND ART

Typically cellular telephones have a common antenna for receiving and transmitting signals within a relatively wide bandwidth. Various antenna arrangements are known in the art which have a wide enough bandwidth to cover both the transmitter and receiver frequencies used the FDD system.

U.S. Pat. No. 5,659,886 discloses in its preamble that in conventional mobile units for digital radio communication, both the receiver and transmitter are connected to a common receive/transmit antenna via a transmitting passband filter and a receiving passband filter. These filters may be fabricated as dielectric filters or acoustic wave filters. Since such components are difficult to fabricate as integrated circuits and also they are relatively bulky, this patent specification proposes that the transmitting bandpass filter be replaced by an isolator in order to reduce bulk. In the specific examples described, the common antenna comprises an external whip antenna. Isolators are themselves regarded as being inefficient devices because they can dissipate power reflected from the antenna.

Wireless terminals, such as mobile phone handsets, sometimes have an internal antenna, such as a Planar Inverted-F Antenna (PIFA) or similar. Such antennas are small (relative to a wavelength) and therefore, owing to the fundamental limits of small antennas, narrow band. However, cellular radio communication systems such as UMTS require a PIFA to have a fractional bandwidth of 13.3%. To achieve such a bandwidth from a PIFA for example requires a considerable volume, there being a direct relationship between the bandwidth of an antenna and its volume, but such a volume is not readily available with the current trends towards small handsets. Hence, because of the limits referred to above, it is not feasible to achieve efficient wide band radiation from small antennas in present-day wireless terminals.

DISCLOSURE OF INVENTION

It is an object of the present invention to cover wanted frequency bands lying within a relatively wide bandwidth from a relatively small volume common receive/transmit antenna.

According to one aspect of the present invention there is provided a wireless terminal for use in the transmitting and receiving frequency bands of a frequency duplex system, comprising transmitting and receiving stages and signal propagating means coupled to the transmitting and receiving stages, wherein the signal propagating means comprises an antenna structure having sufficient bandwidth to cover the larger one of the transmitting and receiving frequency bands, a receiving filter and a transmitting filter coupled by respective feeds to the antenna structure.

According to a second aspect of the present invention there is provided a module for use in a wireless terminal operable in the transmitting and receiving frequency bands of a frequency duplex system, comprising signal propagating means including an antenna structure having sufficient bandwidth to cover the larger one of the transmitting and receiving frequency bands, a receiving filter and a transmitting filter coupled by respective feeds to the antenna structure and having terminals for connection to the RF stages the wireless terminal.

The present invention is based on recognition of the fact that filters can be used to make a narrow band antenna structure reusable at different frequencies lying in a pass band bridging the transmitter and receiver pass bands of a FDD system.

In an embodiment of the invention the antenna structure comprises a PIFA. The PIFA may include two differential slots which separate the PIFA into a central element and two outer elements which are interconnected at one end. A free end of the central element is connected to a ground plane and the free ends of the two outer elements are connected respectively to the transmitting and receiving filters.

The filters may be solid state filters such as Bulk Acoustic Wave (BAW) and Surface Acoustic Wave (SAW) filters.

BRIEF DESCRIPTION OF THE DRAWINGS

The present invention will now be described by way of example, with reference to the accompanying drawings, wherein.

In the drawings the same reference numerals have been used to indicate corresponding features.

MODES FOR CARRYING OUT THE INVENTION

Figure 1:
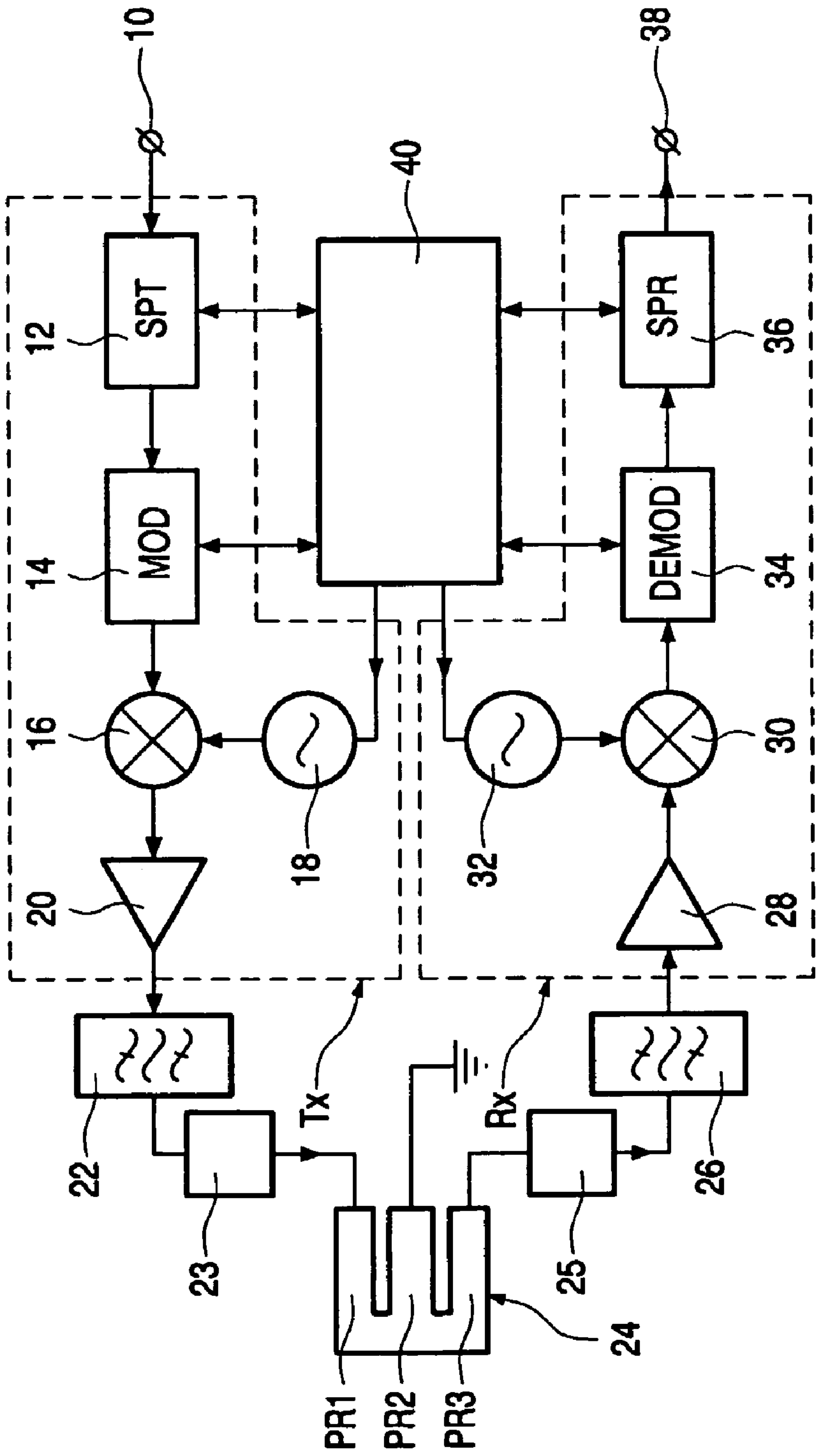
FIG. 1 is a block schematic diagram of an embodiment of a wireless terminal made in accordance with the present invention.

Referring to FIG. 1, the transceiver comprises a transmitter section Tx including a signal input terminal 10 coupled to an input signal processing stage (SPT) 12. The stage 12 is coupled to a modulator (MOD) 14 which provides a modulated signal to a frequency up-converter comprising a multiplier 16 to which a signal generator 18, such as a frequency synthesiser, is also connected. The frequency up-converted signal is coupled to a signal propagating structure 24 by way of a power amplifier 20, a transmitter filter 22 and a matching/frequency tuning network 23.

A receiver section Rx of the transceiver comprises a low noise amplifier 28 coupled to the signal propagating structure 24, by way of a matching/frequency tuning network 25 and a receiver filter 26. An output of the low noise amplifier 28 is coupled to a frequency down-converter comprising a multiplier 30 and a signal generator 32, such as a frequency synthesiser. The frequency down-converted signal is demodulated in a demodulator (DEMOD) 34 and its output is applied to a signal processing stage (SPR) 36 which provides an output signal on a terminal 38. The operation of the transceiver is controlled by a processor 40.

Figure 2:
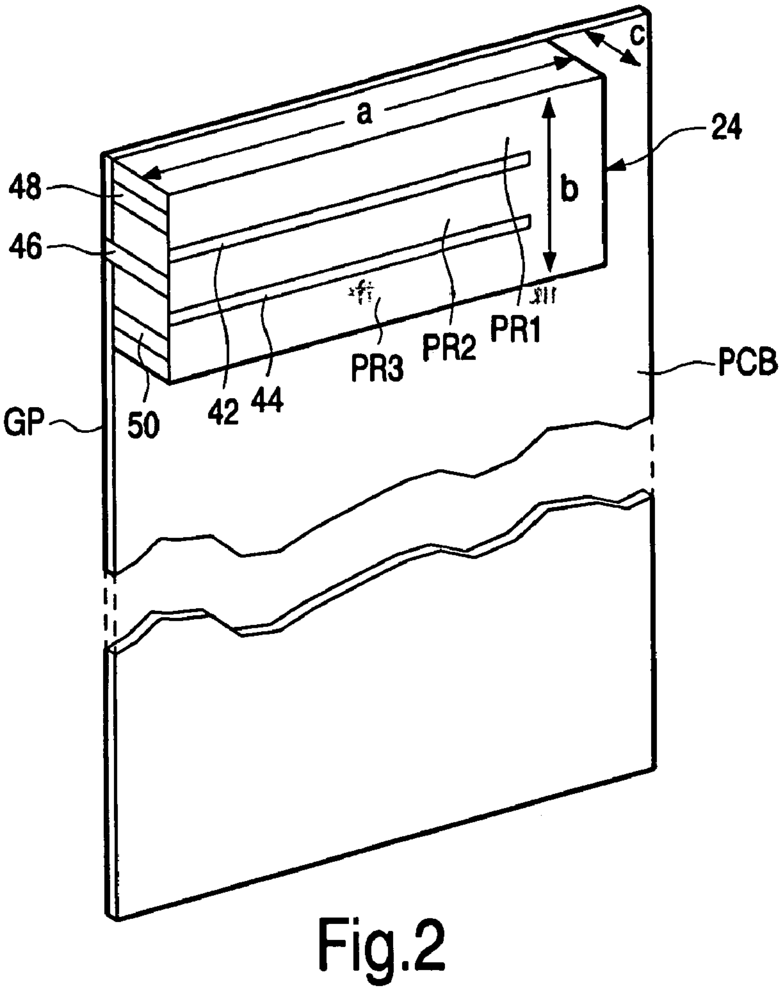
FIG. 2 is a diagram of a circuit board having a PIFA and transmitting and receiving filters.

Referring to FIG. 2, a printed circuit board PCB has components (not shown) on one side and a ground plane GP on the reverse side. A PIFA 24 is mounted on, or carried by, the PCB. The PIFA can be implemented in several alternative ways, for example as a preformed metal plate carried by the PCB using posts of an insulating material, as a pre-etched piece of printed circuit board carried by the PCB, as a block of insulating material having the PIFA formed by selectively etching a conductive layer provided on the insulating material or by selectively printing a conductive layer on the insulating block or as an antenna on the cell phone case. For use at UMTS frequencies, the dimensions of the PIFA 24 are length (dimension "a") 30 mm, height (dimension "b") 10 mm and depth (dimension "c") 4 mm. These dimensions enable the PIFA 24 to have sufficient bandwidth to cover the larger of the FDD UMTS bands. The bandwidth is substantially 3.1%. This is more than a factor of 4 less than the bandwidth required to cover the entire UMTS band (approximately 13.3%). Nominally the PIFA 24 is resonant between the transmit and receive bands.

The PIFA 24 has two differential slots 42, 44 extending lengthwise for part of the distance from one edge to the other. The result is analogous to a comb having three prongs or elements PR1, PR2 and PR3 interconnected at one of their ends and free at the other of their ends. The middle element PR2 is connected by a common shorting pin 46 to the ground plane GP of the PCB. The element PR1 is coupled by a pin 48 to the output of the transmitter filter 22 (FIG. 1) and the element PR3 is coupled by a pin 50 to the input of the receiver filter 26 (FIG. 1).

The differential slots 42, 44 can also be used to tune the resonant frequency of the antenna. Asymmetric slots, that is, slots of different lengths and/or different shapes, will give different resonant frequencies for the two feeds, viz. the pins 48, 50.

Figure 3:
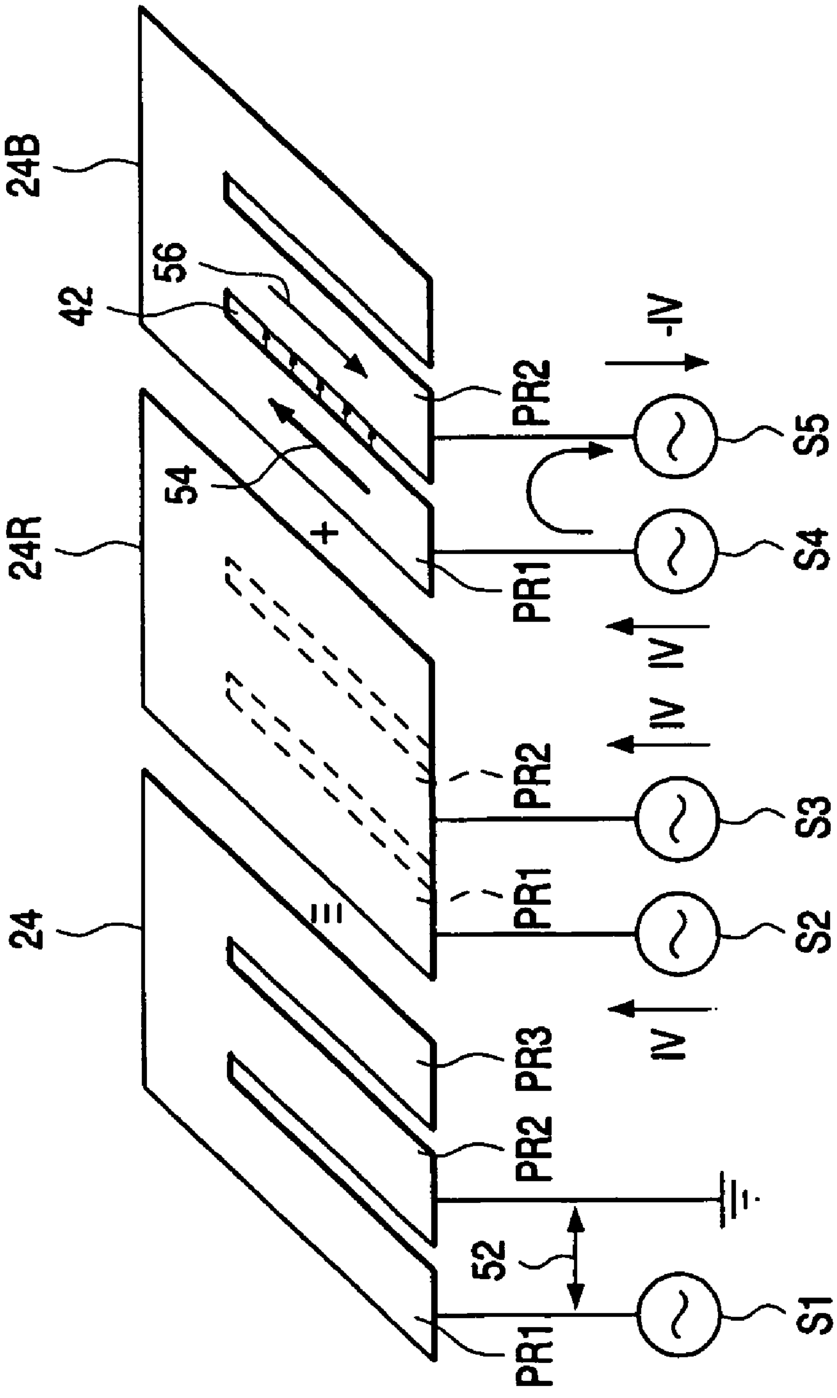
FIG. 3 is a diagram illustrating the radiating (or common) and balanced (or differential) modes of PIFA.

The differential slots are not essential but without them there is a potential problem of the inductance in the coupling to the filter feeding the shorting pin 46. The slots increase the differential mode reactance and facilitate isolation of the unused port, that is, the receiver port in the transmit mode and vice versa in the receive mode. This is illustrated in FIG. 3 in which the drawing shows on the left an embodiment of the PIFA 24 with the element PF2 shorted to ground and a signal source S1 coupled to the element PR1. An arrow 52 indicates that this feed arrangement constitutes a differential port. The PIFA 24 connected in this way can be represented as being equivalent to the combination of a radiating (or common) mode 24R and a balanced (or differential) mode 24B. In the radiating mode 24R, in-phase signal sources S2 and S3 are coupled to the elements PR1 and PR2, respectively, and the PIFA appears as a single one-piece antenna. In the case of the balanced mode 24B, anti-phase sources S4 and S5 are coupled to the elements PR1 and PR2, respectively, so that current flows along PR1 to PR2 as shown by the arrows 54, 56 and a field exists across the slot 42. In this mode the differential mode reactance is increased and it is easier to isolate the unused port by tuning the filter to present a reflective termination, for example an open or short circuit to the antenna.

Figure 4:
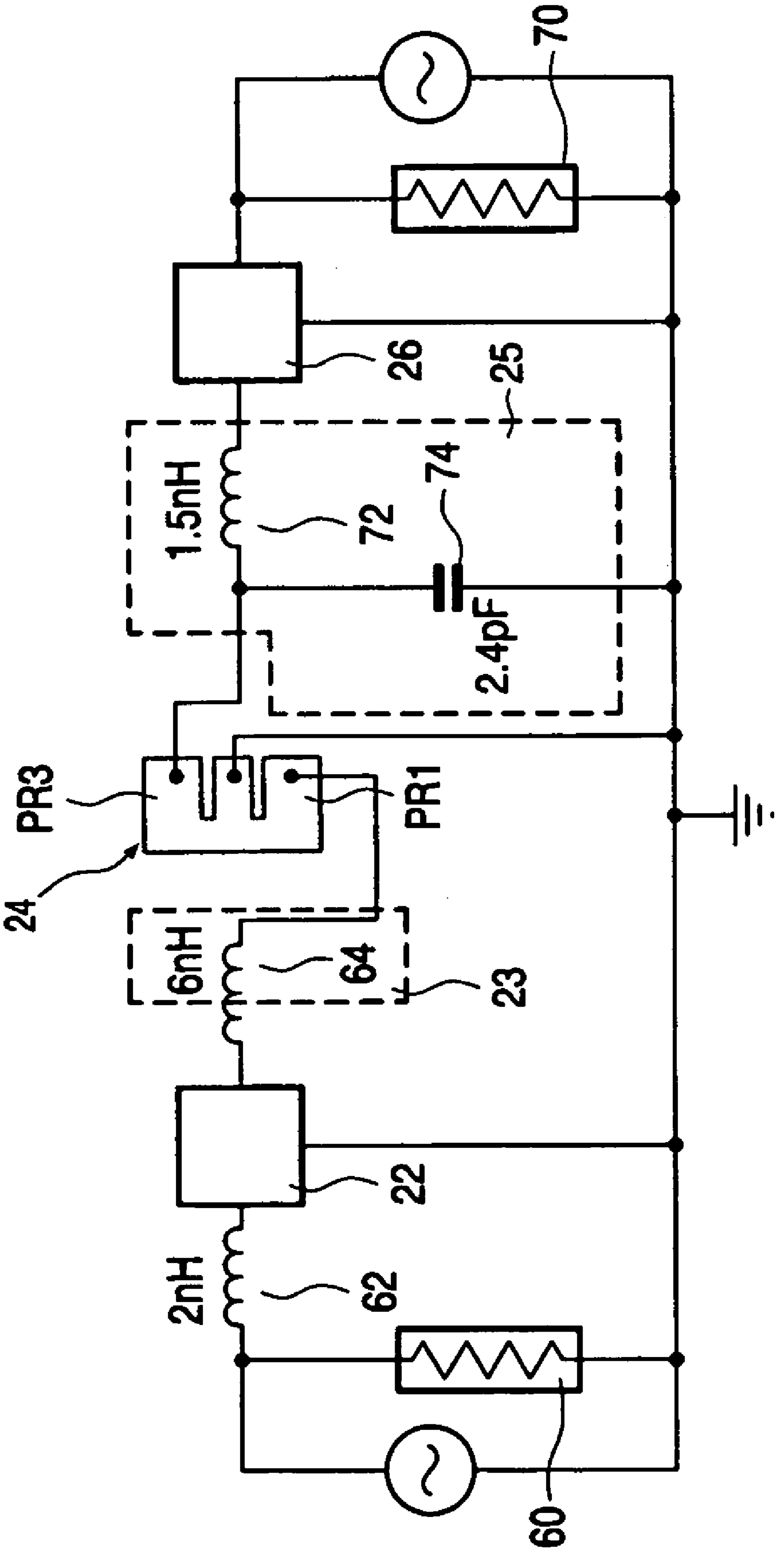
FIG. 4 is a diagram of the antenna structure connected respectively to BAW transmitter and receiver filters.

Referring to FIG. 4, the transmitter filter 22 comprises a 4-element, unbalanced, BAW ladder filter coupled to the antenna element PR1 by way of the matching/frequency tuning network 23. This type of filter allows an unbalanced input and output which is generally required for a transmitter. A source impedance represented by a 50 ohm impedance 60 is coupled by a 2nH inductor 62 to the input of the filter 22. A 6nH inductor 64 couples an output of the filter 22 to the antenna element PR1. The inductors 62 and 64 serve for tuning purposes and the value of the inductor 64 is optimised such that it also reduces the resonant frequency of the PIFA 24 to that required for the transmitter frequency band. Additionally, it is arranged such that it presents an approximate short circuit in conjunction with the BAW filter's output static capacitance (not shown) at the receiver frequency.

The receiver filter 24 comprises a balanced, BAW lattice type of filter having a balanced input for connection to a 50 ohm source impedance 70 which in the embodiment shown in FIG. 1 comprises the low noise amplifier 28 and an unbalanced output coupled to the element PR3 of the PIFA 24. A series 1.5 nH inductor 72 and a shunt 2.4 pF capacitor 74 are provided in the output circuit of the filter 24 and comprise the matching/frequency tuning network 25. The capacitor 74 increases the resonant frequency of the antenna and the inductor 72 ensures that the receiver side is matched and that the combination of the transmitter filter's static capacitance (not shown) and the external circuitry present an approximate short circuit to the antenna for the receiver.

Figure 5:
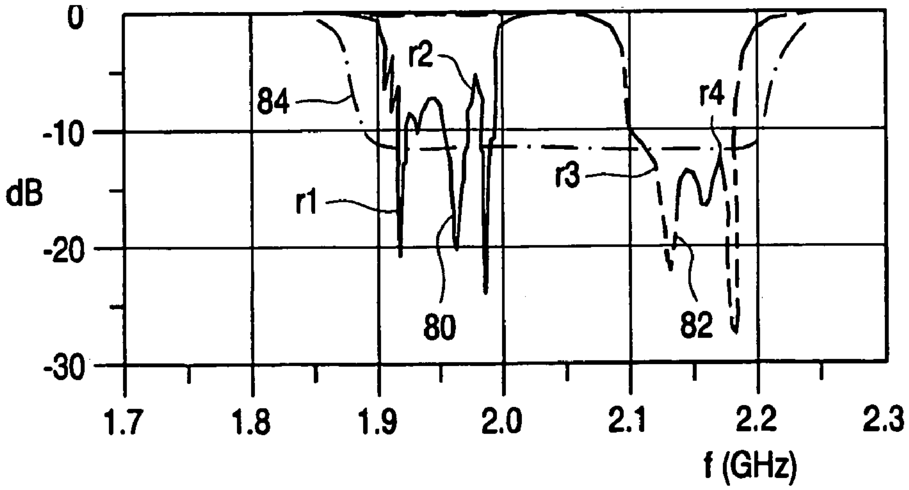
FIG. 5 is the $S_{11}$ response of the antenna structure and BAW filters.

FIG. 5 shows the $S_{11}$ response for the combined PIFA and filter combination shown in FIG. 4 together with an idealised characteristic 84 shown by a chain-dot line for a broadband antenna operating over the UMTS band of frequencies. The $S_{11}$ response comprises a transmitter characteristic 80 shown by a full line and a receiver characteristic 82 shown by a broken line. Referring to the transmitter characteristic 80 the points referenced r1 and r2 and respectively indicate an attenuation of −18.428 dB at a frequency of 1.920 GHz and an attenuation of −6.282 dB at a frequency of 1.980 GHz. In the case of the receiver characteristic 82 the points referenced r3 and r4 respectively indicate an attenuation of −14.057 dB at a frequency of 2.110 GHz and an attenuation of −13.471 dB at a frequency of 2.170 GHz.

It is evident that an acceptable performance is achieved in both the transmitter and receiver bands using an antenna that is too small to cover both bands simultaneously. In the combination shown in FIG. 4 the receiver was optimised first and in consequence shows a better performance which is facilitated by the inherent better performance of the lattice filter 24. However it is believed that the transmitter performance could be improved by further design iterations.

FIG. 5 confirms that the concept of utilising filters to make a compact antenna reusable at different frequency duplex frequencies is valid. It is possible for similar results to be obtained with other types of filter besides BAW filters, such as SAW and ceramic filters.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of wireless terminals and component parts therefor and which may be used instead of or in addition to features already described herein.

The invention claimed is:

1. A wireless terminal for use in the transmitting and receiving frequency bands of a frequency duplex system, comprising transmitting and receiving stages and signal propagating means coupled to the transmitting and receiving stages, wherein the signal propagating means comprises a single radiating antenna structure having sufficient bandwidth to cover the larger one of the transmitting and receiving frequency bands, a receiving filter and a transmitting filter coupled by respective feeds to the antenna structure, wherein the antenna structure comprises a Planar Inverted-F Antenna (PIFA) with two differential slots which separate the PIFA into a central element and two outer elements, the central and outer elements being interconnected, in that a free end of the central element is connected to a ground plane and in that free ends of the two outer elements are connected respectively to the receiver and transmitter filters.

2. A terminal as claimed in claim 1, characterised in that the differential slots are of substantially the same size and shape.

3. A terminal as claimed in claim 1, characterised in that the differential slots are asymmetric.

4. A terminal as claimed in claim 1, 2, or 3, characterised in that the transmitter and receiver filters are Bulk Acoustic Wave (BAW) filters.

5. A module for use in a wireless terminal operable in the transmitting and receiving frequency bands of a frequency duplex system, comprising signal propagating means including a single radiating antenna structure having sufficient bandwidth to cover the larger one of the transmitting and receiving frequency bands, a receiving filter and a transmitting filter coupled by respective feeds to the antenna structure and having terminals for connection to the RF stages of the wireless terminal, wherein the antenna structure comprises a Planar Inverted-F Antenna (PIFA) with two differential slots which separate the PIFA into a central element and two outer elements, the central and outer elements being interconnected, in that a free end of the central element is connected to a ground plane and in that free ends of the two outer elements are connected respectively to the receiver and transmitter filters.

6. A module as claimed in claim 5, characterised in that the transmitter and receiver filters are Bulk Acoustic Wave (BAW) filters.

* * * * *